United States Patent
Sato (10) Patent No.: US 8,593,658 B2
(45) Date of Patent: Nov. 26, 2013

(54) INFORMATION PROCESSING DEVICE, NETWORK SYSTEM AND IMAGE FORMING DEVICE

(75) Inventor: Atsushi Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 171 days.

(21) Appl. No.: 13/089,509

(22) Filed: Apr. 19, 2011

(65) Prior Publication Data

US 2011/0261387 A1 Oct. 27, 2011

(30) Foreign Application Priority Data

Apr. 22, 2010 (JP) .................................. 2010-098471

(51) Int. Cl.
*G06F 3/12* (2006.01)
(52) U.S. Cl.
USPC ........................................ 358/1.14; 358/1.15
(58) Field of Classification Search
USPC ............................................. 358/1.15, 1.14
See application file for complete search history.

(56) References Cited

U.S. PATENT DOCUMENTS

2005/0216514 A1* 9/2005 Murata ...................... 707/104.1
2011/0002003 A1* 1/2011 Suwabe ...................... 358/1.14

FOREIGN PATENT DOCUMENTS

| JP | A-2005-193560 | 7/2005 |
| JP | A-2007-323324 | 12/2007 |
| JP | A-2009-267659 | 11/2009 |

* cited by examiner

*Primary Examiner* — King Poon
*Assistant Examiner* — Andrew H Lam
(74) *Attorney, Agent, or Firm* — Muncy, Geissler, Olds & Lowe, PLLC (57) ABSTRACT

An information processing device includes: a user information obtaining part that obtains user information of users who use an image forming device; and an ID information configuration part that configures an ID for the user information obtained by the user information obtaining part and that configures, for the ID, functional restrictions that are specific for the ID with respect to the image forming device. The ID information configuration part configures, for different user information, IDs that are respectively provided for various functional restrictions.

11 Claims, 9 Drawing Sheets

| ID | Functional Restrictions | | |
|---|---|---|---|
| | Black and White Printing | Color Printing | Print Page Restriction |
| 0 | Not Allowed | Not Allowed | - |
| 1 | Allowed | Allowed | 100 |
| 2 | Allowed | Allowed | 50 |
| 3 | Allowed | Not Allowed | 150 |
| 10 | Allowed | Allowed | 300 |

Fig. 5

| User Name/Group Name | ID | Type |
|---|---|---|
| Unregistered ID | 0 | User |
| Sato | 1 | User |
| Suzuki | 2 | User |
| Takahashi | 3 | User |
| Group A | 10 | Group |
| Tanaka | 10 | User |
| Watanabe | 10 | User |

| User Name/ Group Name | ID | Functional Restrictions | | | Type |
|---|---|---|---|---|---|
| | | Black and White Printing | Color Printing | Print Page Restriction | |
| Unregistered ID | 0 | Not Allowed | Not Allowed | 0 | User |
| Sato | 1 | Allowed | Allowed | 100 | User |
| Suzuki | 2 | Allowed | Allowed | 50 | User |
| Tanaka | 3 | Allowed | Not Allowed | 150 | User |
| Group A | 10 | Allowed | Allowed | 300 | Group |
| Tanaka | 10 | Allowed | Allowed | 300 | User |
| Watanabe | 10 | Allowed | Allowed | 300 | User |

Fig. 11

INFORMATION PROCESSING DEVICE, NETWORK SYSTEM AND IMAGE FORMING DEVICE

CROSS REFERENCE TO RELATED APPLICATION

The present application is related to, claims priority from and incorporates by reference Japanese Patent Application No. 2010-098471, filed on Apr. 22, 2010.

TECHNICAL FIELD

The present specification relates to a network system that allows usage of an image forming device, such as a printer and a multifunction peripheral (MFP) with restrictions in functions available on the image forming device.

BACKGROUND

There has been an image forming device that restricts functions thereof based on user information. For example, Japanese Laid-Open Patent Application No. 2005-193560 (page 10 and FIG. 7) discloses an image forming device that allows releasing a power saving mode based on user information.

To restrict the functions available on the image forming device, such as a printer and an MFP, an identification (ID) may be created for each user, and functional restrictions may be configured for the ID, for example. In this method, however, because the administrator needs to configure the ID for each user when data relating to user and ID are registered in the image forming device or in a server, the configuration process becomes extremely cumbersome for the administrator particularly when the number of users for which the configuration needs to be performed increases.

SUMMARY

An information processing device disclosed in the application includes: a user information obtaining part that obtains user information of users who use an image forming device; and an ID information configuration part that configures an ID for the user information obtained by the user information obtaining part and that configures, for the ID, functional restrictions that are specific for the ID with respect to the image forming device. The ID information configuration part configures, for different user information, IDs that are respectively provided for various functional restrictions.

A network system disclosed in the application includes: the information processing device discussed above, a host device including a user information reference part that refers to the user ID information storage part and obtains the ID that corresponds to the user information, and a job transmitting part that transmits a print job with the ID obtained by the user information reference part; and the image forming device used by the user that further includes: an ID information storage part that receives the information transmitted from the information transmitting part and stores the IDs and the functional restrictions configured for the respective IDs in correspondence with each other; a job receiving part that receives the print job; and a determination section that refers to the ID information storage part, verifies the functional restrictions that correspond to the ID provided with the received print job, and determines whether or not execution of the received print job is allowed based on the functional restrictions.

In another aspect, a network system disclosed in the application includes: the information processing device discussed above; and a host device that includes: a user information storage part that refers to the user ID information storage part and obtains the functional restrictions configured for the ID that corresponds to the user information; a job transmitting part that transmits the print job; and a functional restriction determination part that determines whether or not execution of the received print job is allowed based on the functional restrictions received by the user information reference part.

According to the embodiments of the present application, functional restrictions that are specific are configured for each ID, and an ID may be assigned to each group of users. Therefore, types of IDs are not increased beyond necessity, and the ID configuration process by the administrator is simplified.

DETAILED DESCRIPTION OF EMBODIMENTS

First Embodiment

Figure 1:
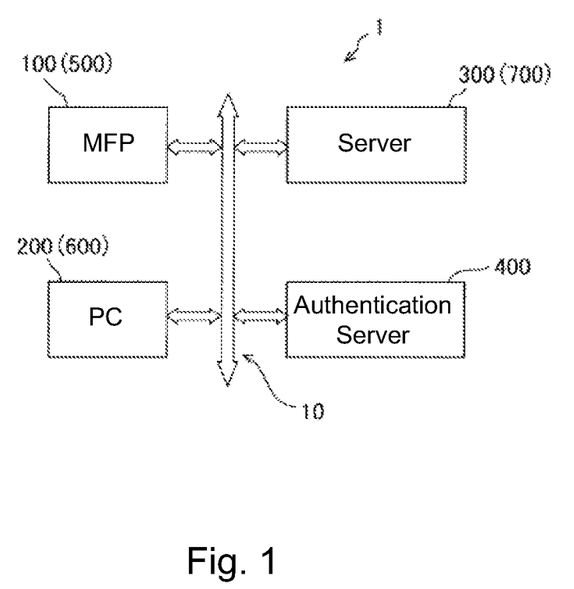
FIG. 1 is a block diagram of a local area network (LAN network) showing an exemplary configuration of a network system according to embodiments.
Figure 2:
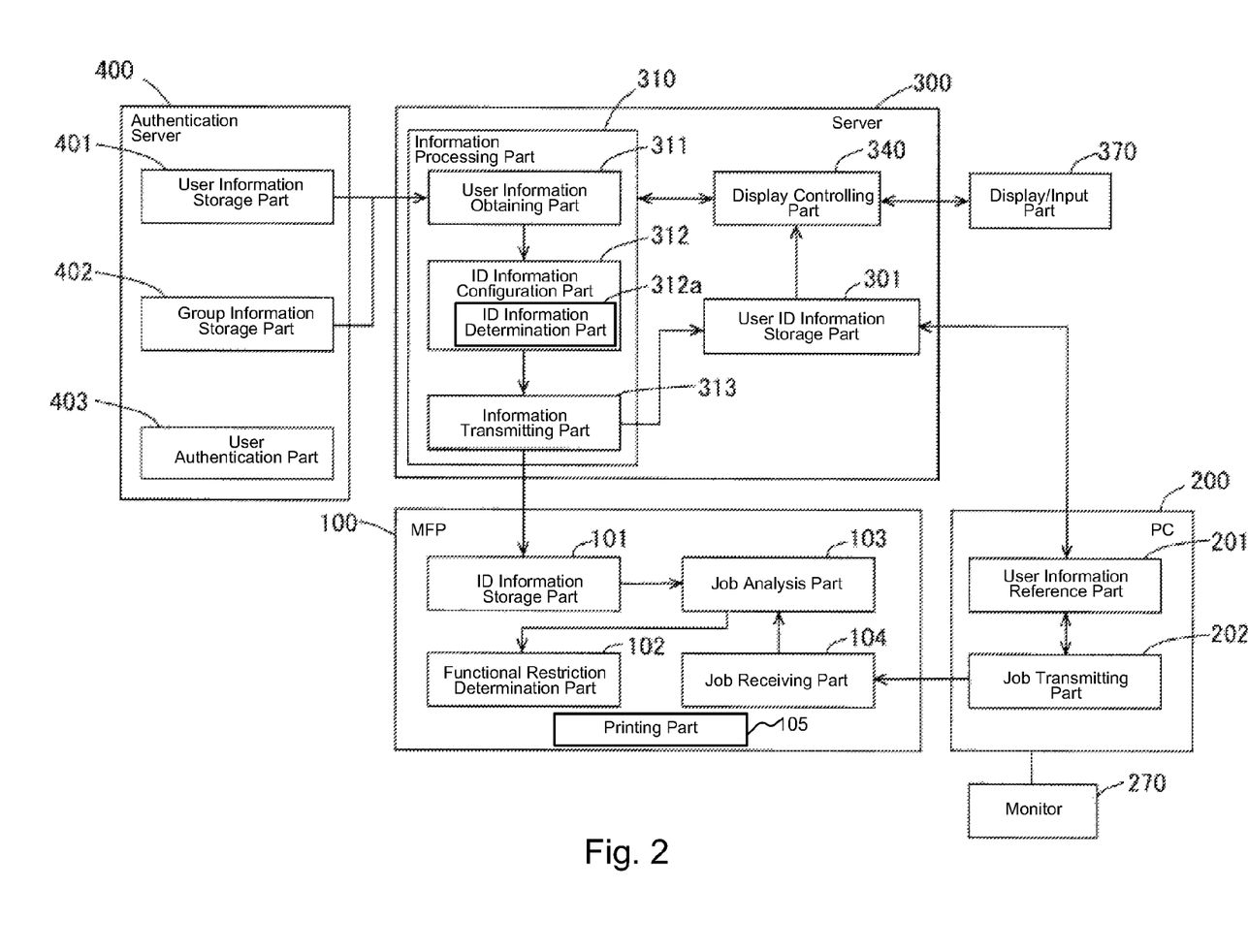
FIG. 2 is a block diagram of a main part of the first embodiment for explaining a signal flow in the LAN network.

FIG. 1 is a block diagram of a LAN network showing an exemplary configuration of a network system according to the first embodiment. FIG. 2 is a block diagram of a main part of the first embodiment for explaining a signal flow in the LAN network.

As shown in FIG. 1, the LAN network 1 includes a multifunctional peripheral (MFP) 100, a personal computer (PC) 200, a server 300 and an authentication server 400. The MFP 100, the PC 200, the server 300 and the authentication server 400 are connected to each other by a LAN cable 10. Reference numerals in parentheses are described later.

Figure 5:
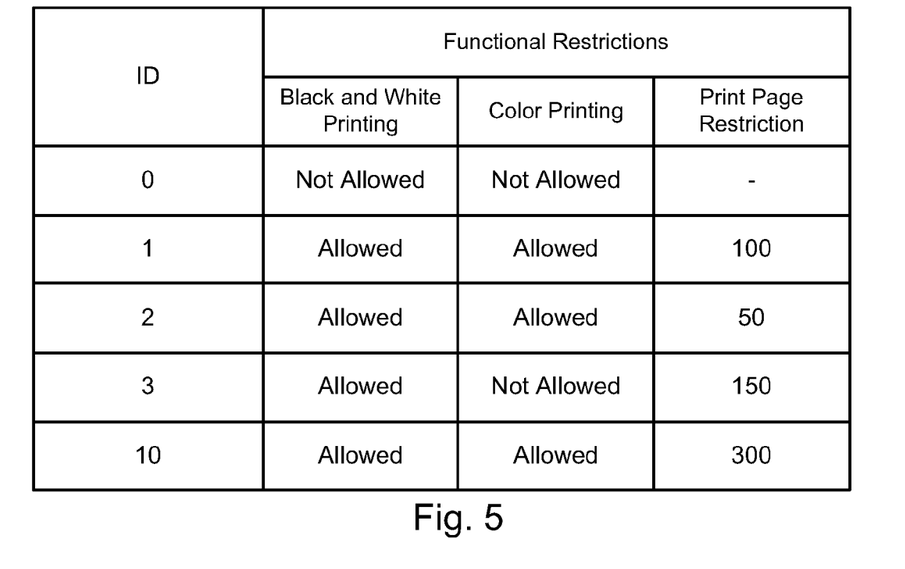
FIG. 5 illustrates exemplary data stored in an ID information storage part of the MFP in the first embodiment.

As shown in FIG. 2, the MFP 100, which functions as an image forming device, includes an ID information storage part 101, a functional restriction determination part 102, a job analysis part 103 that analyzes an ID provided for a print job received by the MFP 100, and a job receiving part 104 that receives the print job. The ID information storage part 101 has a function to store information of IDs configured by an information processing part 310 of the later-discussed server 300. The information of the IDs stored in the ID information storage part 101 is information indicating types of the functional restrictions for the ID. Exemplary information stored is shown in FIG. 5. As shown in FIG. 5, in the ID information storage part 101, "black and white printing," "color printing" and "print page restriction," which are items for the functional restrictions, are associated with each ID, and also functional conditions for the items "black and white printing" and "color printing" and the upper limit value for the item "print page restriction" are stored for each ID.

"Not allowed" for the item "color printing" means "color printing is not allowed," and "not allowed (prohibited)" for the item "black and white printing" means "black and white printing is not allowed." In contrast, "allowed" for the item "color printing" means "color printing is allowed (executable)," and "allowed" for the item "black and white printing" means "black and white printing is allowed." When data for color printing is received while the item "color printing" is "not allowed" and when the item "black and white printing" is "allowed," the data may be deleted (canceled) as discussed later, or alternatively, may be converted into, and printed as, data for black and white printing.

In addition, the print page restriction is a number of pages allowed for printing in one month, for example, and may be configured for each ID as discussed below. Therefore, when there is a multiple number of users with the same ID, that is, for example, when the ID for Suzuki (see FIG. 6), person α (not shown) and person β (not shown) is 2 (ID=2), the upper limit for the number of pages allowed for printing for the ID being 2 (ID=2) is 50 pages. Therefore, the upper limit for the number of pages that the three people can print in the period is 50 pages. In the example shown in FIG. 5, when "black and white printing" and "color printing" are both prohibited, the print page restriction is not displayed because the printing is entirely prohibited.

In addition, the items for the functional restrictions may differ depending on types of the MFP (e.g., printer as another example) for which the IDs are registered. For example, in case of a black and white printer, the item "color printing" is not needed. In addition, the number of the restrictions that can be registered may differ depending on the types of the MFP (e.g., printer as another example).

The job receiving part 104 has a function to receive print jobs transmitted to the MFP 100. The job analysis part 103 has a function to obtain IDs provided for the print jobs received by the job receiving pat 104. Moreover, the job analysis part 103 obtains the information of functional restrictions configured for the obtained IDs by referring to the information stored in the ID information storage part 101 (FIG. 5). The functional restriction determination part 102 has a function to determine whether or not the print job received by the MFP 100 is restricted, based on the information of functional restrictions obtained by the job analysis part 103. As a result of the determination, when the received print job is not restricted, the print job is executed by a printing part 105. When the received print job is restricted, the received print job is canceled. The job analysis part 103 and the functional restriction determination part 102 correspond to a determination section.

The PC 200, which functions as a host device, includes a user information reference part 201 that obtains an ID configured for a logged-in user from a user ID information storage part 301 of the server 300, and a job transmitting part 202 that transmits the ID obtained by the user information reference part 201 by providing the obtained ID for a print job. A monitor 270 displays data required for signal processing at the PC 200 as needed.

The server 300, which functions as an information processing device, includes an information processing part 310, the user ID information storage part 301, and a display controlling part 340 that controls a display of a display/input part 370. The information processing part 310 includes a user information obtaining part 311, an ID information configuration part 312 and an information transmitting part 313.

The display/input part 370 includes an input part, such as a monitor and a keyboard. The display controlling part 340 displays the later-discussed various screens on the monitor of the display/input part 370 based on instructions from the information processing part 310, and transmits operation information at the input part, such as a click, to the information processing part 310.

Using the user information obtaining part 311, the information processing part 310 has a function to obtain user information and group information managed by a user information storage part 401 and a group information storage part 402 of the later-discussed authentication server 400. As the information to be obtained, user names are obtained from the user information storage part 401, and group names and names of users belonging to the groups are obtained from the group information storage part 402.

Moreover, using an ID information configuration part 312, the information processing part 310 has a function to configure an ID for each of the user names and group names obtained by the user information obtaining part 311 and to configure the functional restriction for the ID. The configured information is transmitted to the user ID information storage part 301 and the ID information storage part of the MFP 100 by the information transmitting part 313.

Figure 6:
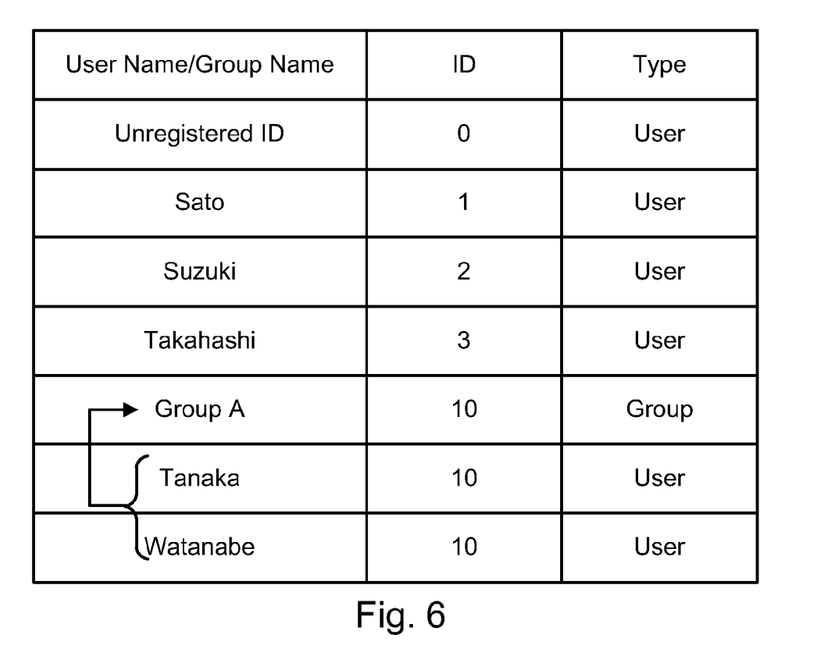
FIG. 6 illustrates exemplary data stored in a user ID information storage part of a server in the first embodiment.

FIG. 6 illustrates an example of information stored by the user ID information storage part 301. As shown in FIG. 6, the user and group names and the IDs are stored in correspondence with each other in the user ID information storage part 301. Information regarding the IDs configured for each user is also stored in the user ID information storage part 301. Here, "Tanaka" and "Watanabe" belong to a group called "Group A," and the users of Group A are configured commonly with the ID assigned to Group A (here ID=10), as discussed later. In addition, as discussed with reference to FIG. 5, the information indicating the functional restrictions configured for each ID is stored in the ID information storage part 101 (FIG. 5).

The authentication server 400 provides a directory service, such as the Active Directory (by Microsoft Corporation), and includes the user information storage part 401 and the group information storage part 402. The authentication server 400 also includes a user authentication part 403 that authenticates the users in response to a request from the PC (PC 200) on the LAN network 1.

In the user information storage part 401, information such as addresses, telephone numbers and email addresses, is stored in addition to the user names and passwords for logging on from the PC (PC 200) on the LAN network 1. The information of the users stored in the above-described user information storage part 401 is stored in groups in the group information storage part 402. Moreover, the user authentication part 403 performs user authentication using the user information managed by the authentication server 400. Because the authentication server 400 manages the user information as a whole, the user names and passwords need not be saved in the PC (PC 200) on the LAN network 1.

An example was described above in which only the PC 200 is connected as the PC on the LAN network 1. The user authentication part 403 also authenticates the user of each PC using the user information managed by the authentication server 400 when multiple PCs are connected to the LAN network 1.

Next, the overall operation on the LAN network 1 is explained. It is assumed that information of each user and group has already been configured in the user information storage part 401 and the group information storage part 402 in the authentication server 400 and that a user of the PC 200 has been authenticated and logged on by a user name stored in the user information storage part 401.

Figure 3:
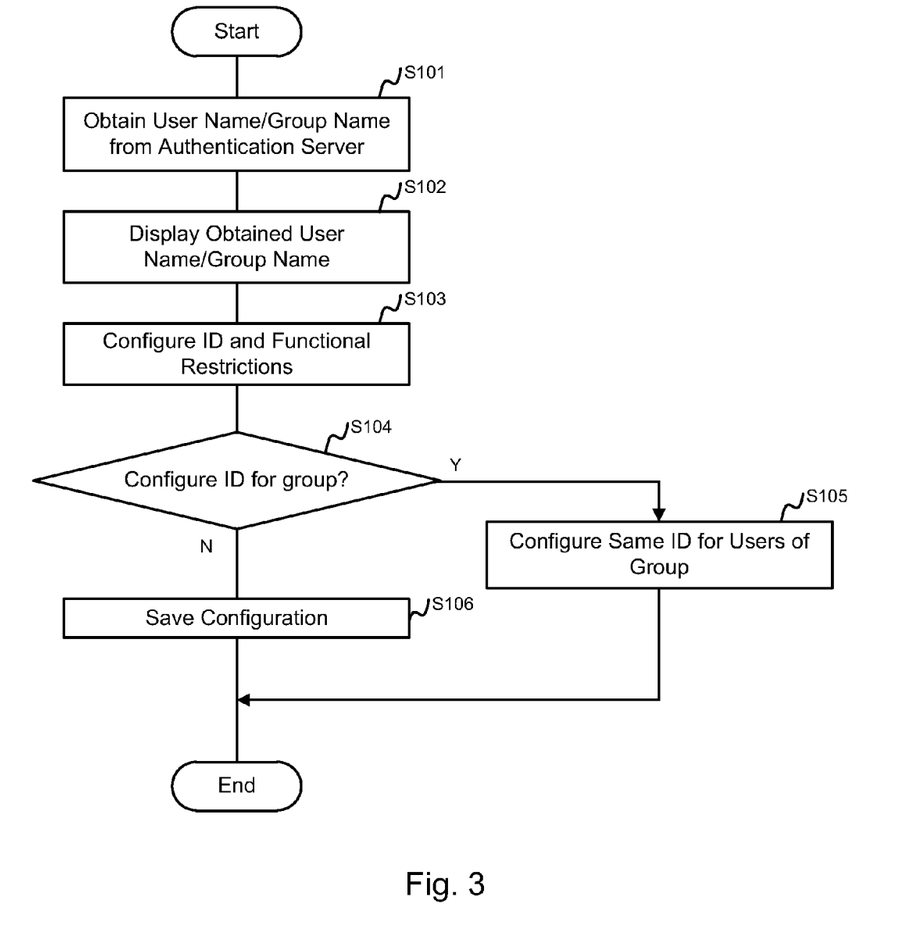
FIG. 3 is a flow diagram illustrating a process flow for configuring an ID and functional restrictions for each user name and group name by an information processing part in the first embodiment.

(Configuration of ID and Functional Restriction) FIG. 3 is a flow diagram illustrating a process flow for configuring IDs for the obtained user names and group names and for configuring functional restrictions for the IDs using the information processing part 301. The process for configuring the IDs and the functional restrictions are explained with reference to the flow diagram.

Figure 7:
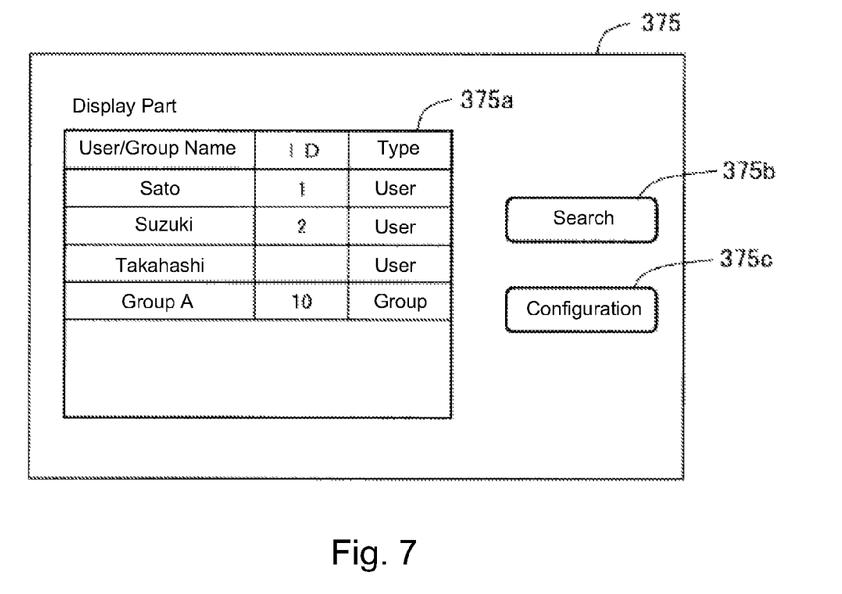
FIG. 7 illustrates a selection screen displayed on a display/input part controlled by a display controlling part.

FIG. 7 shows a selection screen 375 displayed on the display/input part 370 controlled by the display controlling part 340. As shown in FIG. 7, a display part 375*a*, a "Search" button 375*b* and a "Configuration" button 375*c* are displayed in the selection screen 375. When the selection screen 375 is executed, nothing is displayed in the display part 375*a*. Therefore, the display in the display part 375*a* shown in FIG. 7 is an exemplary display for the process for configuring the IDs as discussed below.

When the administrator clicks to select the "Search" button 375*b* displayed in the selection screen 375, the flow shown in FIG. 3 is started. Using the user information obtaining part 311, the information processing part 310 obtains information from the user information storage part 401 and the group information storage part 402 of the authentication server 400 (S101). The information that is obtained here is a user name obtained from the user information storage part 401 and a group name and the user name belonging to the group obtained from the group information storage part 402.

The information obtained at S101 is displayed in the display part 375*a* (FIG. 7) of the selection screen 375 on the display/input part 370 by the display controlling part 340 (S102). At this time, by referring to the user ID information storage part 301, when an ID has been configured for the displayed user, the ID is also displayed. The display in the display part 375*a* shown in FIG. 7 is an example of such a circumstance. The user and group names displayed in the display part 375*a* at this time may be the entire information stored in the user information storage part 401 and the group information storage part 402 or may be information searched based on a predetermined search condition. In this example, a result of searching by users having an initial "S" or "T" and groups having an initial "A," is shown, for example.

Figure 8:
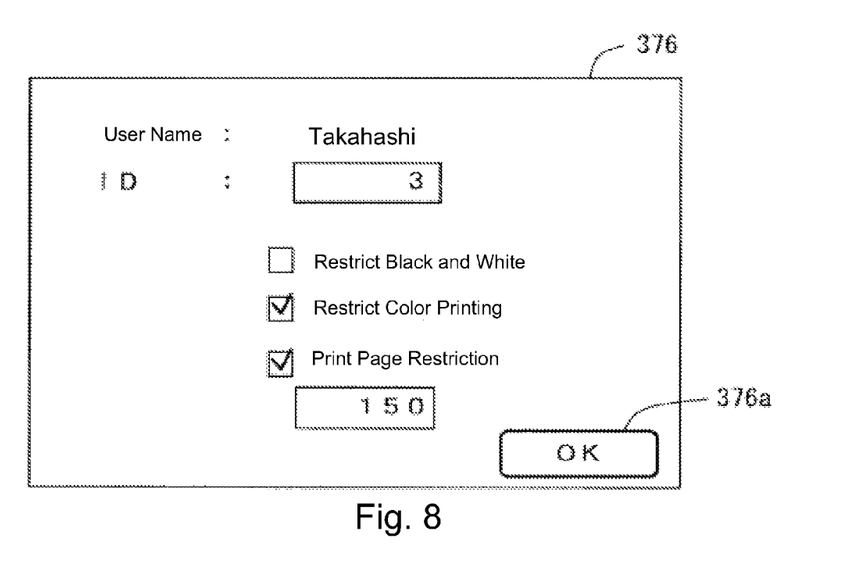
FIG. 8 illustrates an ID information configuration screen displayed on the display/input part controlled by the display controlling part.

The ID information configuration part 312 configures an ID and functional restrictions for the user and group name displayed in the display part 375*a* based on an operation by the administrator (S103). For example, when the administrator selects a user or a group from the user and groups names listed in the display part 375*a* of the selection screen 375 as shown in FIG. 7, for which IDs are to be configured, and clicks the "Configuration" button 375*c*, an ID information configuration screen 376 shown in FIG. 8 is displayed on the display/input part 370. In this example, a user name "Takahashi" has been selected.

As shown in FIG. 8, the selected user name, an input area for the ID corresponding to the user name, check areas for the functional restrictions including the black and white printing, color printing and print page restriction, and an input area for the print page restriction are displayed in the ID information configuration screen 376. When a group is selected, the "User Name" in the ID information configuration screen 376 shown in FIG. 8 becomes "Group Name."

While viewing the selection screen 375, the administrator enters an ID number, checks the items for the desired functional restrictions and enters the desired print page restriction. By clicking the "OK" button 376*a*, the ID and the functional restrictions for the displayed user are configured. In FIG. 8, for the user name "Takahashi," the ID is set to "3" (ID=3), "Restrict Color Printing" is checked (i.e., color printing is prohibited), and the print page restriction is set to 150 pages.

Moreover, multiple users and groups may be configured for a single ID. However, when the same ID is configured, the same functional restrictions are configured for all users and groups for that ID.

Further, each ID is configured to have individual functional restrictions that are specific for the ID. Therefore, for entering the functional restrictions in the ID information configuration screen 376 shown in FIG. 8, the following restrictions apply: (1) When the functional restrictions have already been configured for the entered ID, the configured functional restrictions are automatically selected upon entry of the ID. (2) When the "OK" button is clicked, when the selected items for the functional restrictions already exist for another ID, the entry is rejected, and the administrator is notified by displaying an ID with the selected functional restrictions.

Next, the ID information configuration part 312 determines, using an ID information determination part 312*a*, whether or not the configuration of the ID is for a group or a user (S104). When the configuration of the ID is for a group (Yes, S104), the same ID is automatically configured for all users, who belong to the group and for whom an ID has not been configured (S105), and the process continues to S106. In addition, at S105, for the user for whom an ID has already been configured, the administrator may select whether the ID configured for a group is used or the ID that has already been configured for the user is still used. When the configuration of the ID is for a user, as determined at S104 (No, S104), the process continues to S106.

Then, the information (or configuration) configured by the ID information configuration part 312 is saved in the user ID information storage part 301, and in the ID information storage part 101 of the MFP 100 (S106). At this time, in the user ID information storage part 301, the user name and the ID are stored in correspondence with each other, and the information indicating the IDs configured for the users is saved, as discussed above with reference to FIG. 6. In the ID information storage part 101 of the MFP 100, the information indicating the functional restrictions for the IDs is saved, as discussed above with reference to FIG. 5.

Figure 4:
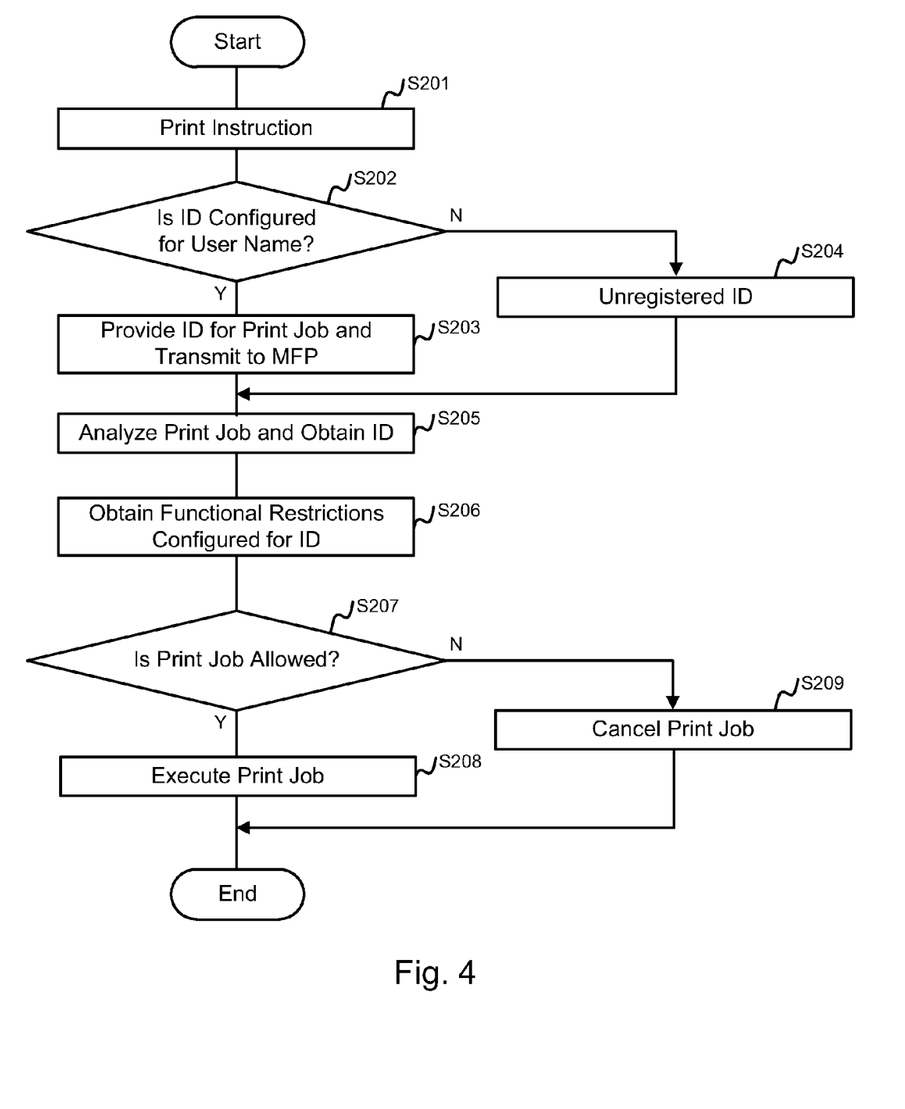
FIG. 4 is a flow diagram illustrating a process flow for transmitting a print job from a personal computer (PC) to an MFP in the first embodiment.

(Process for Transmitting Print Jobs) FIG. 4 is a flow diagram illustrating a process flow for transmitting a print job from the PC 200 to the MFP 100 in the LAN network 1 (FIG. 1). The process for transmitting a print job is explained below with reference to the flow diagram.

When the PC 200, on which a user has logged on using a user name stored in the user information storage part 401 of the authentication server 400, performs a print instruction for transmitting a print job to the MFP 100 (S201), a user information reference part 201 of the PC 200 refers to the information (FIG. 6) stored in the user ID information storage part 301 of the server 300 and determines whether or not an ID has been configured for the user name used for logging on the PC 200 (S202).

When an ID has been configured for the logged-on user name (Yes, S202), the user information reference part 201 obtains the ID from the user ID information storage part 301. A job transmitting part 202 provides the ID obtained by the user information reference part 201 to a print job and transmits the print job to a job receiving part 104 of the MFP 100 (S203).

When it is determined at 5202 that an ID has not been configured for the logged-on user name (No, S202), an unregistered ID for an unregistered user (see FIG. 6) is provided for the print job to be transmitted. The ID number for the unregistered ID is "0" in the example explained using the ID information configuration part 376 shown in FIG. 8, for which the functional restrictions apply in all items (see FIG. 5).

The job receiving part 104 of the MFP 100 receives the print job. The job analysis part 103 analyzes the print job received by the job receiving part 104 and obtains the ID (including the unregistered ID) provided for the print job (S205). Then the functional restrictions configured for the ID are obtained by referring to the information of the functional restrictions shown in FIG. 5 that is stored in the ID information storage part 101 (S206).

The functional restriction determination part 102 determines whether or not the functional restrictions obtained at S206 allow the print job received by the MFP 100 (S207). When the print job is allowed (Yes, S207), the MFP 100 executes the print job at the printing part 105 (S208). When the print job is not allowed (No, S207), the MFP 100 cancels the print job (S209).

For example, when the ID provided for the print job is "3," the functional restrictions allow only the black and white printing, and the print page restriction is 150 pages (see FIG. 5). Therefore, the functional restriction determination part 102 determines whether or not the configuration data for the print job designates the black and white printing and whether or not the number of pages to be printed by execution of the current print job exceeds 150 pages, which is the maximum number of pages allowed for the ID "3" for the period (here, one month). When the black and white printing is designated and when the print page number is equal to or less than 150 pages, the functional restriction determination part 102 instructs the execution of the print job. For other conditions, the functional restriction determination part 102 cancels the print job.

The MFP 100 includes a print page counter (not shown) that counts, for each ID, the print page number for the print job provided with the respective ID for the predetermined unit period (here, one month). The functional restriction determination part 102 determines the print page number by referencing the number counted by the print page counter.

According to the system of the present embodiment, because the same ID is configured for the users for which the same functional restrictions apply, the number of types of the IDs does not increase more than necessary. As a result, the configuration of the functional restrictions is eased. Furthermore, in the conventional MFPs, when the IDs are registered in the MFP, the number of IDs that can be registered in each MFP is limited. Therefore, the IDs cannot be registered beyond the limited number of IDs. However, according to the system of the present embodiment, such a problem is resolved because the number of IDs does not increase as much.

In addition, according to the system of the present embodiment, the configuration of IDs for users can be performed by groups. Therefore, there is an advantage that the restriction of the print page number, for example, can be configured for the groups. Moreover, the IDs and functional restrictions can be configured by selecting only the users and groups that require the configuration. Further, because the information regarding the functional restrictions need not be saved in the operating authentication server, there is an advantage that the authentication server can be utilized for registration of IDs for the MFP.

Second Embodiment

Figure 9:
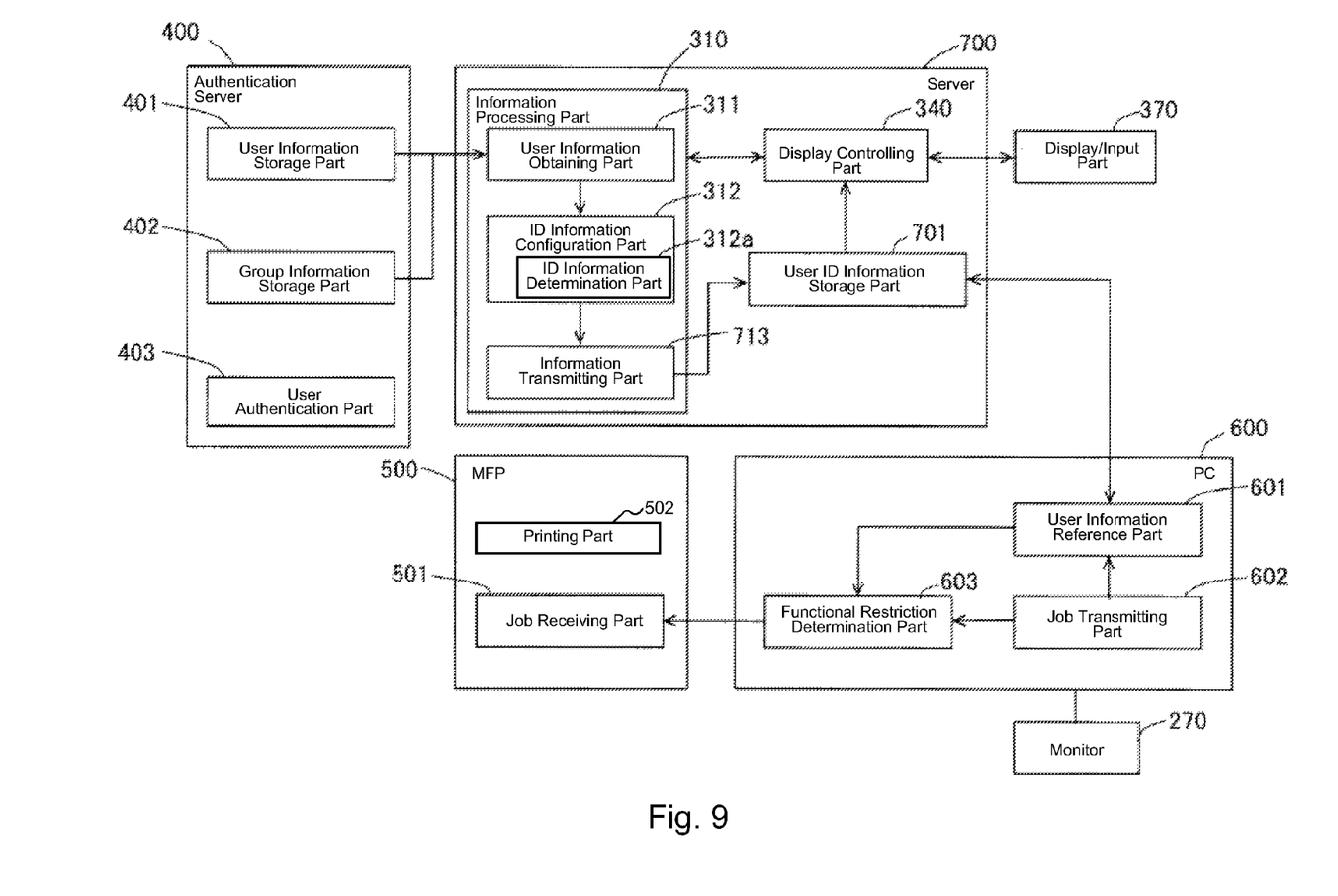
FIG. 9 is a block diagram of a main part of the second embodiment for explaining a signal flow in the LAN network.

FIG. 9 is a block diagram of a main part of the second embodiment for explaining a signal flow in the LAN network 1 (FIG. 1) illustrating an exemplary configuration of a network in the second embodiment.

Figure 11:
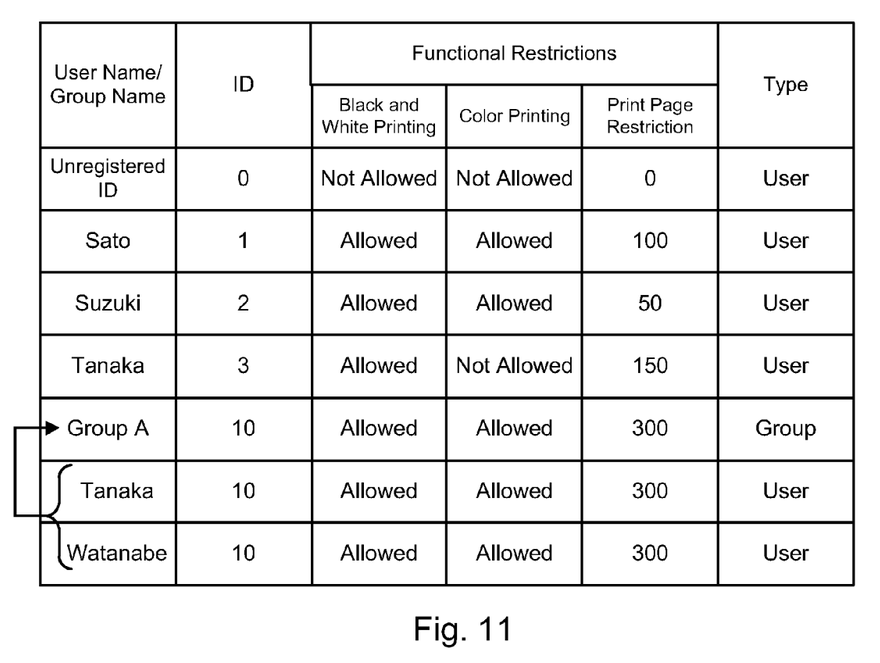
FIG. 11 illustrates an example of data stored in a user ID information storage part of a server in the second embodiment.

Differences between the LAN network in the second embodiment and the LAN network in the first embodiment are configurations of an MFP 500 and a PC 600 and contents of the configuration information transmitted by an information transmitting part 713 of the server 700 and stored in a user ID information storage part 701. Therefore, explanations of parts of the network system in the present embodiment that are common with the network system in the first embodiment are omitted by referencing the reference numerals in the first embodiment or by removing the illustration of such parts. The explanations are focused on the differences. Further, because the overall connections in the LAN network 1 in the present embodiment are the same as the LAN network 1 in the first embodiment shown in FIG. 1 with exceptions of different reference numerals for different parts, FIG. 1 is referred to as needed. The reference numerals of FIG. 1 used in the present embodiment are indicated by parentheses An information transmitting part 713 of the server 700, which functions as an information processing device, transmits to the user ID information storage part 701 the information regarding the IDs configured for the users and the information regarding the functional restrictions configured for the IDs that are configured by the ID information configuration part 312. FIG. 11 illustrates exemplary data stored in the user ID information storage part 701. As shown in FIG. 11, the user and group names, the IDs and the functional restrictions are stored in correspondence with each other in the user ID information storage part 701. That is, information of the IDs configured for the respective users and information regarding the functions restrictions configured for the respective IDs are stored in the user ID information storage part 701.

The MFP 500, which functions as an image forming device, includes a job receiving part 501 that receives print jobs transmitted from the PC 600, which functions as a host device. The MFP 500 also includes a user information reference part 601, a job transmitting part 602 and a functional restriction determination part 603.

The user information reference part 601 of the PC 600 has functions to refer to the user ID information storage part 701 of the server 700 and to obtain the ID configured for the user name used for logging on the PC 600 and the functional restrictions configured for the ID. The job transmitting part 602 has a function to transmit the print jobs. The functional restriction determination part 603 determines whether or not the functional restrictions obtained by the user information reference part 601 allow the print job transmitted by the job transmitting part 602. When the print job is allowed, the functional restriction determination part 603 transmits the print job transmitted from the job transmitting part 602, to the job receiving part 501 of the MFP 500. When the print job is not allowed, the functional restriction determination part 603 does not transmit but cancels the print job.

Next, the overall operation of the LAN network 1 according to the present embodiment is explained. It is assumed that the information of users and groups have already been configured and stored in the user information storage part 401 and the group information storage part 402 of the authentication server 400. It is also assumed that the user has logged on the PC 600 using a user name stored in the user information storage part 401.

(Configuration of ID and Functional Restrictions) In the LAN network 1 in the present embodiment, the process flow, performed by the information processing part 310, for configuring IDs for the user names and the group names obtained by the user information obtaining part 311 and configuring the functional restrictions for the IDs is the same as the process flow that is explained in the first embodiment with reference to the flow diagram in FIG. 3. Therefore, the explanation of such flow is omitted except the following points.

At S106 of the flow diagram shown in FIG. 3, the information configured by the ID information configuration part 312 is saved in the user ID information storage part 701. At this time, the user and group names, the IDs and the functional restrictions are stored in correspondence with each other in the user ID information storage part 701 as explained in FIG. 11. That is, the information of the IDs configured for the respective users and the information regarding the functional restrictions configured for the respective IDs are stored in the user ID information storage part 701.

Figure 10:
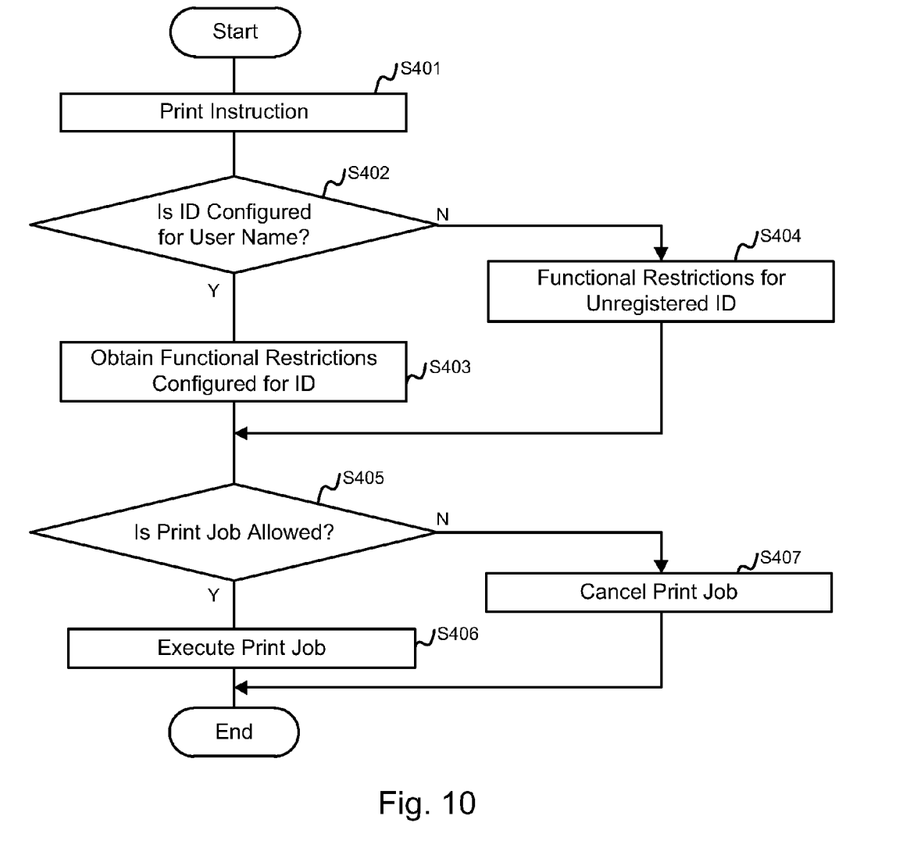
FIG. 10 is a flow diagram illustrating a process flow for a print job transmitted from the PC to the MFP in the second embodiment.

(Processes for Transmitting Print Jobs) FIG. 10 is a flow diagram illustrating a process flow for a print job transmitted from the PC 600 to the MFP 500 in the LAN network 1 (FIG. 1) in the present embodiment. The process for transmitting the print job is explained with reference to the flow chart.

When the PC 600, on which a user has logged on using a user name stored in the user information storage part 401 of the authentication server 400, instructs printing to transmit a print job to the MFP 500 (S401), the user information reference part 601 of the PC 600 refers to the information (FIG. 11) stored in the user ID information storage part 701 of the server 700 and determines whether or not an ID has been configured for the user name by which the user logged on the PC 600 (S402).

When an ID has been configured for the logged-on user name (Yes, S402), the user information reference part 601 obtains the ID of the logged-on user name and the functional restrictions configured for the ID (S403). On the other hand, when it is determined that an ID has not been configured for the logged-on user name (No, S402), the functional restrictions for the ID for an unregistered user, that is, the functional restrictions that restrict all restrictable functions are obtained. (S404).

The functional restriction determination part 603 of the PC 600 determines whether or not the functional restrictions obtained by the user information reference part 601 restrict the print job to be transmitted from the job transmitting part 202 (S405). When the print job is not restricted and thus is allowed (Yes, S405), the print job transmitted from the job transmitting part 602 is sent to the job receiving part 501 of the MFP 500. When the print job is restricted and thus is not allowed (No, S405), the print job is canceled (S407). The MFP 500 executes the print job received by the job receiving part 501 using a printing part 502 (S406).

For example, when the ID provided with the print job is "3," the functional restrictions allow only the black and white printing, and the print page restriction is 150 pages. Therefore, the functional restriction determination part 603 determines whether or not the configuration data for the print job designates the black and white printing and whether or not the print page number by execution of the current print job exceeds 150 pages, which is the maximum number of pages allowed for the ID "3" for the period (here, one month). When the black and white printing is designated and when the print page number is equal to or less than 150 pages, transmission of the print job is executed. For other conditions, the print job is canceled.

The PC 600 includes a print page counter (not shown) that counts, for each ID, the print page number for the print job provided with the respective ID for the predetermined unit period (here, one month). The functional restriction determination part 603 determines the print page number by referencing the number counted by the print page counter.

According to the system of the present embodiment, because the same ID is configured for the users for which the same functional restrictions apply, the number of types of the IDs does not increase more than necessary. As a result, the configuration of the functional restrictions is eased. In addition, all information relating to the user names and IDs is stored in the server 700, and the restriction of the print job is determined by the client PC (PC 600). Therefore, the transmitted print job can be unconditionally processed for printing by the MFP 500. As a result, it is not necessary to provide any specific features for the MFP 500.

In the above-described embodiments, a single MFP is connected to the LAN network as an example. However, the embodiments are not limited to this. Multiple image forming devices, such as MFPs, may be provided on the same network. In such a case, the configuration of the functional restrictions is also performed once, and the functional restrictions can be configured for all printers and MFPs based on such configuration.

What is claimed is:

1. An information processing device, comprising:
a user information obtaining part that obtains first user information of a first user who uses an image forming device, second user information of a second user who uses the image forming device, and group information of a group to which the first user and the second user belong;
an ID information configuration part that configures a common functional restriction ID for the first user information, the second user information and the group information obtained by the user information obtaining part; and
an information transmitting part that transmits configuration information configured by the ID information configuration part; and
a user ID information storage part that receives the configuration information transmitted from the information transmitting part and that stores the first user information, the second user information, the group information and the functional restriction ID in correspondence with each other, wherein
the functional restriction ID uniquely corresponds to one set of predefined functional restrictions with respect to the image forming device, and
the user ID information storage part further stores the functional restriction ID and the functional restrictions configured for the functional restriction ID in correspondence with each other.

2. The information processing device of claim 1, wherein the ID information configuration part configures the functional restriction ID for the first user information, the second user information and the group information based on administrator operation.

3. The information processing device of claim 2, wherein the ID information configuration part configures a same functional restriction ID for the first user information and the second user information after the functional restriction ID is configured for the group information based on the administrator operation.

4. The information processing device of claim 1, wherein the functional restrictions include a restriction relating to color printing, a restriction relating to black and white printing, and a restriction relating to the maximum number of prints.

5. A network system comprising:

the information processing device of claim 1;

a host device that includes:
- a user information reference part that refers to the user ID information storage part and that obtains the functional restriction ID that corresponds to the first user information of the first user who has logged in the host device; and
- a job transmitting part that transmits a print job with the functional restriction ID obtained by the user information reference part; and an image forming device includes:
- an ID information storage part that receives the configuration information transmitted from the information transmitting part and that stores the functional restriction ID and the functional restrictions configured for the functional restriction ID in correspondence with each other;
- a job receiving part that receives the print job; and
- a determination section that refers to the ID information storage part, and that determines whether or not execution of the received print job is allowed based on the functional restrictions that correspond to the functional restriction ID.

6. The network system of claim 5, further comprising:

an authentication server including a user information storage part that stores the first user information and the second user information, and a group information storage part that stores the group information.

7. A network system, comprising:

the information processing device of claim 1; and a host device that includes:
- a user information reference part that refers to the user ID information storage part and that obtains the functional restrictions configured for the functional restriction ID that corresponds to the first user information of the first user who has logged in the host device;
- a job transmitting part that transmits the print job; and
- a determination part that determines whether or not execution of the print job to be transmitted is allowed based on the functional restrictions obtained by the user information reference part.

8. The network system of claim 7, further comprising:

an image forming device that executes the print job transmitted from the host device.

9. The network system of claim 7, further comprising:

an authentication server including a user information storage part that stores the first user information and the second user information, and a group information storage part that stores the group information.

10. An image forming device connected to a host device and the information processing device of claim 1, the host device including a user information reference part that refers to the user ID information storage part and that obtains the functional restriction ID that corresponds to the first user information of the first user who has logged in the host device, and a job transmitting part that transmits a print job with the functional restriction ID obtained by the user ID information reference part, the image forming device comprising:
- an ID information storage part that receives the configuration information transmitted from the information transmitting part and that stores the functional restriction ID and the functional restrictions configured for the functional restriction ID in correspondence with each other;
- a job receiving part that receives the print job; and
- a determination section that refers to the ID information storage part, and that determines whether or not execution of the received print job is allowed based on the functional restrictions that correspond to the functional restriction ID provided with the received print job; and
- a printing part that executes the received print job.

11. The information processing device of claim 1, wherein if a functional restriction ID that is the same as the functional restriction ID exists at the time of configuration of the functional restriction ID for first user information, the ID information configuration part automatically selects functional restrictions corresponding to the already existing functional restriction ID.

* * * * *